United States Patent [19]
Tang et al.

[11] Patent Number: 6,160,629
[45] Date of Patent: Dec. 12, 2000

[54] MULTIPLE COPY PRINTER WITH PRINT JOB RETENTION

[75] Inventors: Michael Tang; Marianne Savola, both of Boise, Id.

[73] Assignee: Hewlett-Packard Company, Palo Alto, Calif.

[21] Appl. No.: 09/181,177

[22] Filed: Oct. 26, 1998

[51] Int. Cl.[7] ..................................................... B41B 1/00
[52] U.S. Cl. ........................................... 358/1.1; 358/1.14
[58] Field of Search ................................... 358/1.1, 1.15, 358/1.9, 1.19, 401, 405, 406

[56] References Cited

U.S. PATENT DOCUMENTS

| | | | |
|---|---|---|---|
| 5,140,675 | 8/1992 | Okada | 395/114 |
| 5,150,455 | 9/1992 | Mroikawa et al. | 395/114 |
| 5,164,842 | 11/1992 | Gauronske et al. | 358/401 |
| 5,371,873 | 12/1994 | Niwa | 395/425 |
| 5,398,305 | 3/1995 | Yawata et al. | 395/101 |
| 5,436,730 | 7/1995 | Hube | 358/401 |
| 5,668,936 | 9/1997 | Motooka et al. | 395/114 |
| 5,791,790 | 8/1998 | Bender et al. | 400/61 |
| 5,832,191 | 11/1998 | Thorne | 395/114 |
| 5,832,301 | 11/1998 | Yamaguchi | 395/868 |

*Primary Examiner*—Jerome Grant, II
*Assistant Examiner*—Kevin C Kianni

[57] ABSTRACT

A printer and method that allows the user to store print jobs indefinitely in the printer's disk drive or other data storage device. The printer stores a document and prints one or more copies of the document from an electronic transmission of a single copy of the document accompanied by a command indicating the desired disposition of the document. The printer includes a user interface, a controller that includes a data storage device, and a print engine connected to the controller. The controller is electrically connected to the user interface and the controller is configured to receive the electronic transmission of data representing a document to be printed and the desired disposition of the document and, in response to the transmission, to cause the printer to (a) print the document at least once and store the document in the storage device, (b) store the document in the storage device and hold it there until released for printing via the user interface, or (c) copy the document to the storage device and hold it there until the document is released for printing by inputting a predefined privacy code.

20 Claims, 9 Drawing Sheets

MULTIPLE COPY PRINTER WITH PRINT JOB RETENTION

FIELD OF THE INVENTION

The invention relates generally to image forming devices for document generators and, more particularly, to an image forming device that is capable of storing a print job temporarily or permanently to generate multiple copies from a single transmission of one copy from a document generator at the time of the initial transmission or at any time after the initial transmission.

BACKGROUND OF THE INVENTION

There are many electronic devices capable of generating data which needs to be printed in document form. This general class of document generators includes such devices as computers, facsimile machines, digital cameras and copiers, medical imaging devices, optical scanners, satellite imaging devices, scientific data collection devices, etc. It is common among these types of devices to employ a single processor to perform the various data collection, organization and print request functions. Unfortunately, when the processor is busy processing a print request it is unavailable for other tasks.

One example which readily demonstrates this problem is when the user of a personal computer requests multiple copies of a single document and then has to wait until the computer completes multiple print requests before he or she can again use the computer. To help combat this problem, computer application designers developed background printing which attempts to make the computer more available by processing print requests printing only during idle times for the processor. In this instance, a multipage collated document printed "n" number of times would significantly slow down foreground processing of the user's document. This implementation is a consequence of the way the command "copies=" was originally implemented on Hewlett-Packard Company LaserJet® printers, specifically in the printer command language (PCL), which has become an industry standard. Most users experience a noticeable decrease in the response of the computer. Additionally, when the print job is sent repeatedly over a computer network to the printer, the response time of the communications network can be noticeably affected.

Printing multiple copies of a multipage, collated document using a software application, such as a word processor, involves multiple transmissions to the printer from the application. In DOS environments, the user can suffer a significant loss of productivity due to the time taken by the application to format and print multiple jobs. Since the printer command "copies=" is page-based, not print job based, drivers were unable to provide collated multiple copies. Clever coding allowed applications to loop as many times as the number of copies. As the job consisted of back to back repeated collated pages, customers received a collated job despite the "copies=" limitations. While the coding may be clever, this still wastes network bandwidth, and in some cases, causes the print job to be processed at a rate which is significantly slower than the theoretical speed of the print engine.

These problems associated with of requesting multiple copies of a printed job were largely solved through the introduction of Hewlett-Packard's Mopier® printers. The operational features of the Mopier®, which are described in U.S. Pat. No. 5,764,863 entitled Multiple Original Copy Data Printer incorporated herein by reference, provide a way to print multiple copies from a single transmission of only one copy of the document to decrease the use of network resources, computing time and storage space necessary for printing multiple copies or "mopies."

Conventional printers and even Mopiers, however, have heretofore not been capable of providing a variety of advanced print job control features enabled in part by the Mopier's ability to generate multiple copies at the printer. For example, it may be desirable to store print jobs indefinitely for future printing of additional copies. This feature could be particularly helpful in printing environments where forms and other graphically intense documents are generated repeatedly. It may also be desirable to allow a user to secure privacy when printing confidential documents by allowing the user to send a confidential document to the printer but have the printer delay printing the document until the user authorizes printing by entering a privacy code at the printer.

SUMMARY OF THE INVENTION

Accordingly, the present invention is directed to an image forming device such as a printer or Mopier®, and a method that allows the user to store print jobs indefinitely in the printer's disk drive or other data storage device. For purposes of explanation, the invention can be characterized as having three facets. The first facet is the incorporation of a local data storage memory device, preferably non-volatile memory such as a hard drive, into the image forming device. The second facet is the incorporation of firmware or other controlling electronics into the image forming device where the firmware is configured to identify and execute a variety of job retention commands representing the desired disposition of the print job. The third facet is the modification of conventional drivers, application software or other source document generating devices to transmit a single copy of the document accompanied by a command indicating the desired disposition of the document.

In one embodiment of the invention, an image forming device stores a document and prints one or more copies of the document from an electronic transmission of a single copy of the document accompanied by a command indicating the desired disposition of the document. The image forming device includes a user interface, a controller that includes a data storage device, and a print engine connected to the controller. The controller is electrically connected to the user interface and the controller is configured to receive the electronic transmission of data representing a document to be printed and the desired disposition of the document and in response to the transmission to cause the image forming device to (a) print the document at least once and store the document in the storage device, (b) store the document in the storage device and hold it there until released for printing via the user interface, or © copy the document to the storage device and hold it there until the document is released for printing by inputting a predefined privacy code through the control panel.

In a second embodiment of the invention, electronic data representing a document to be printed and/or stored on the image forming device and a command designating the desired disposition of the document is generated by a source document generator. The disposition commands include a first disposition printing the document at least once and storing the document at the image forming device, a second disposition storing the document at the image forming device and holding it there until released for printing via a user interface on the image forming device, or a third disposition copying the document to the image forming device and holding it there until the document is released for printing by inputting a predefined privacy code through the control panel. One or more of these commands is received in the image forming device and analyzing the first, second and third dispositions. Then, in the case of a command for the first disposition, the document is printed at least once and stored at the image forming device. In the case of a command for the second disposition, the document is stored at the image forming device and held until released for printing via a user interface on the image forming device. In the case of a command for the third disposition, the document is copied to the image forming device and held there until the document is released for printing by inputting a predefined privacy code through the control panel.

DETAILED DESCRIPTION OF THE INVENTION

Figure 1:
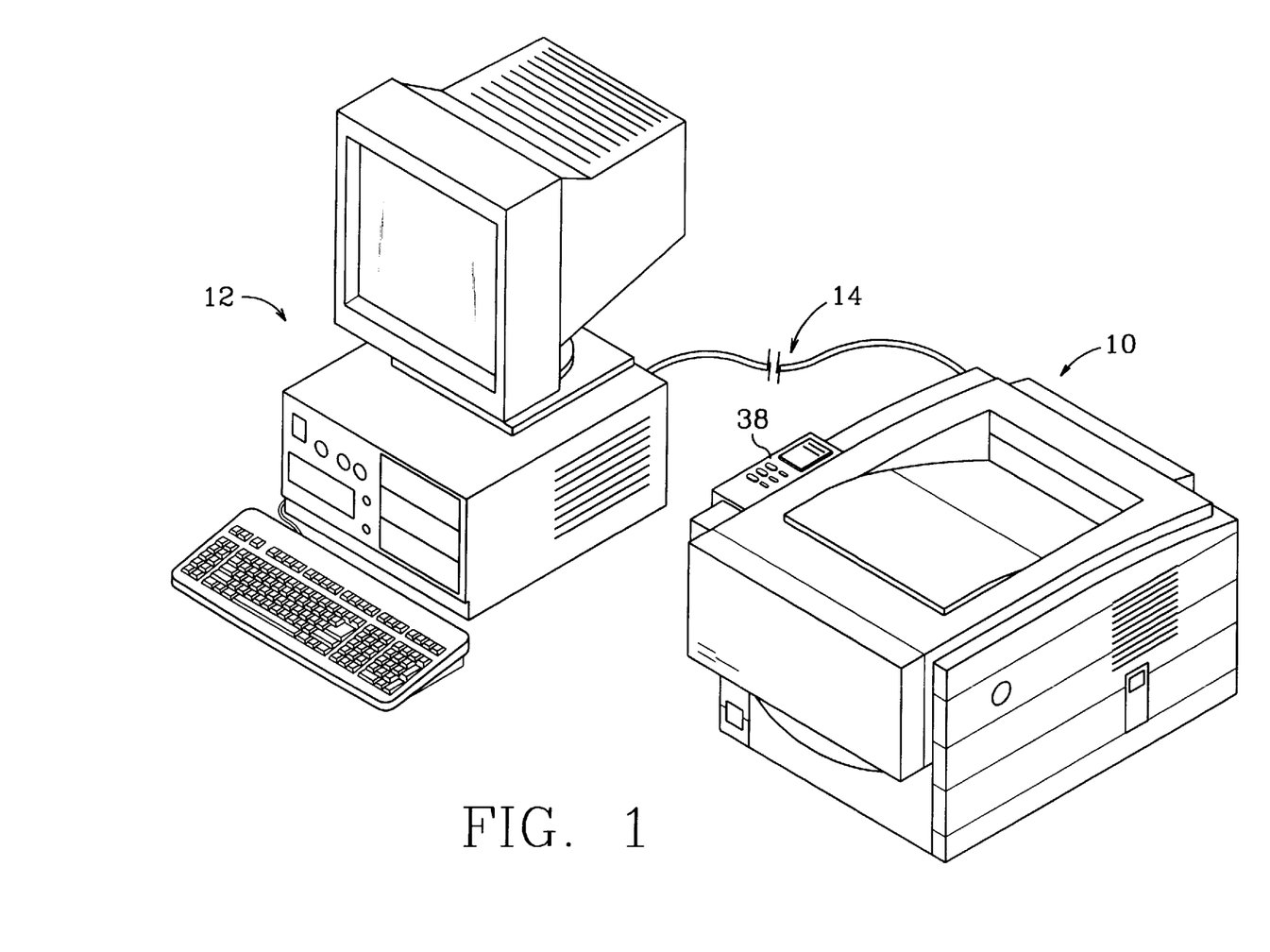
FIG. 1 is an idealized perspective representation of a computer/printer system implementing the multiple copy printer with job retention features of the present invention.
Figure 2:
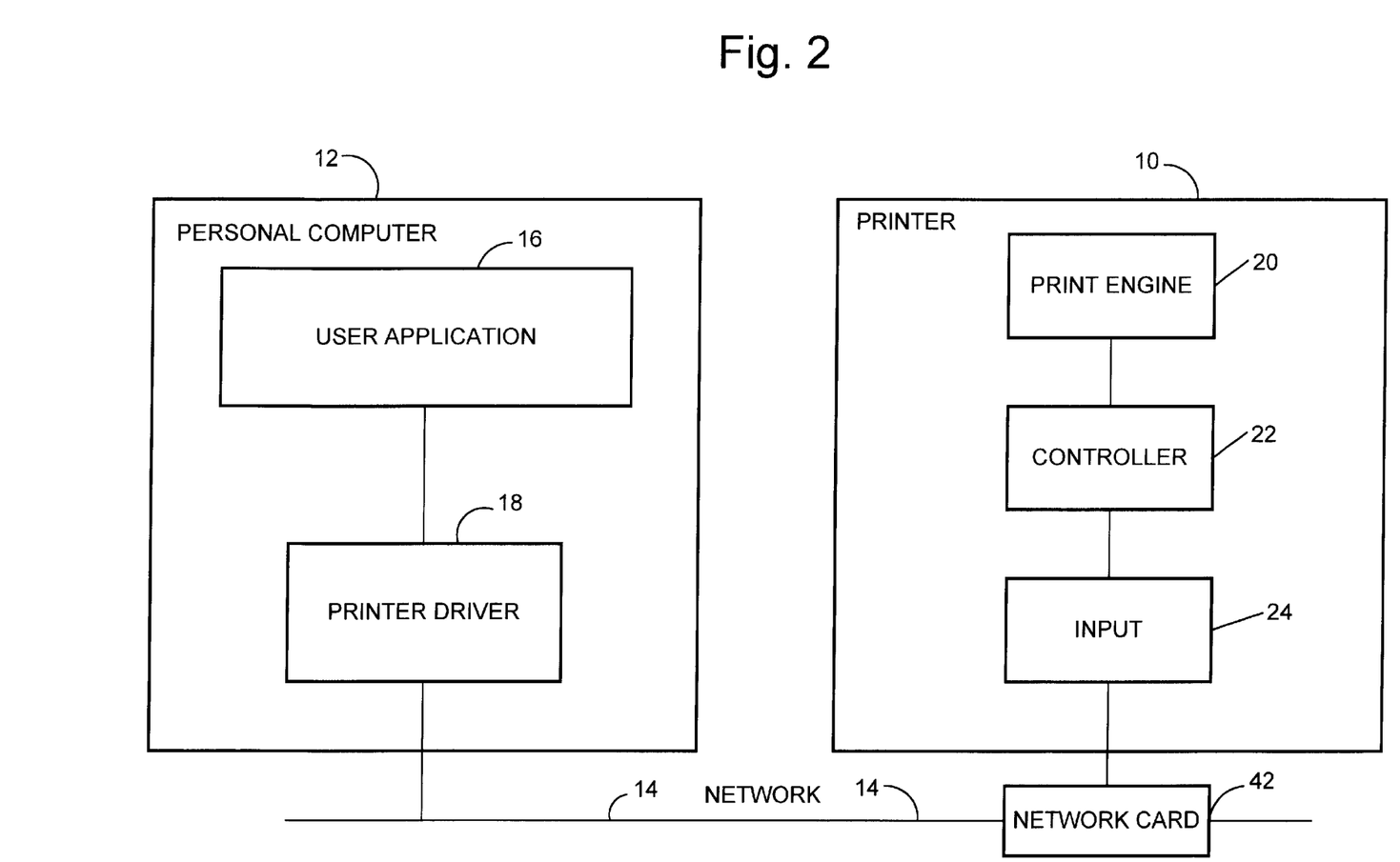
FIG. 2 is a schematic representation of the system of FIG. 1.
Figure 3:
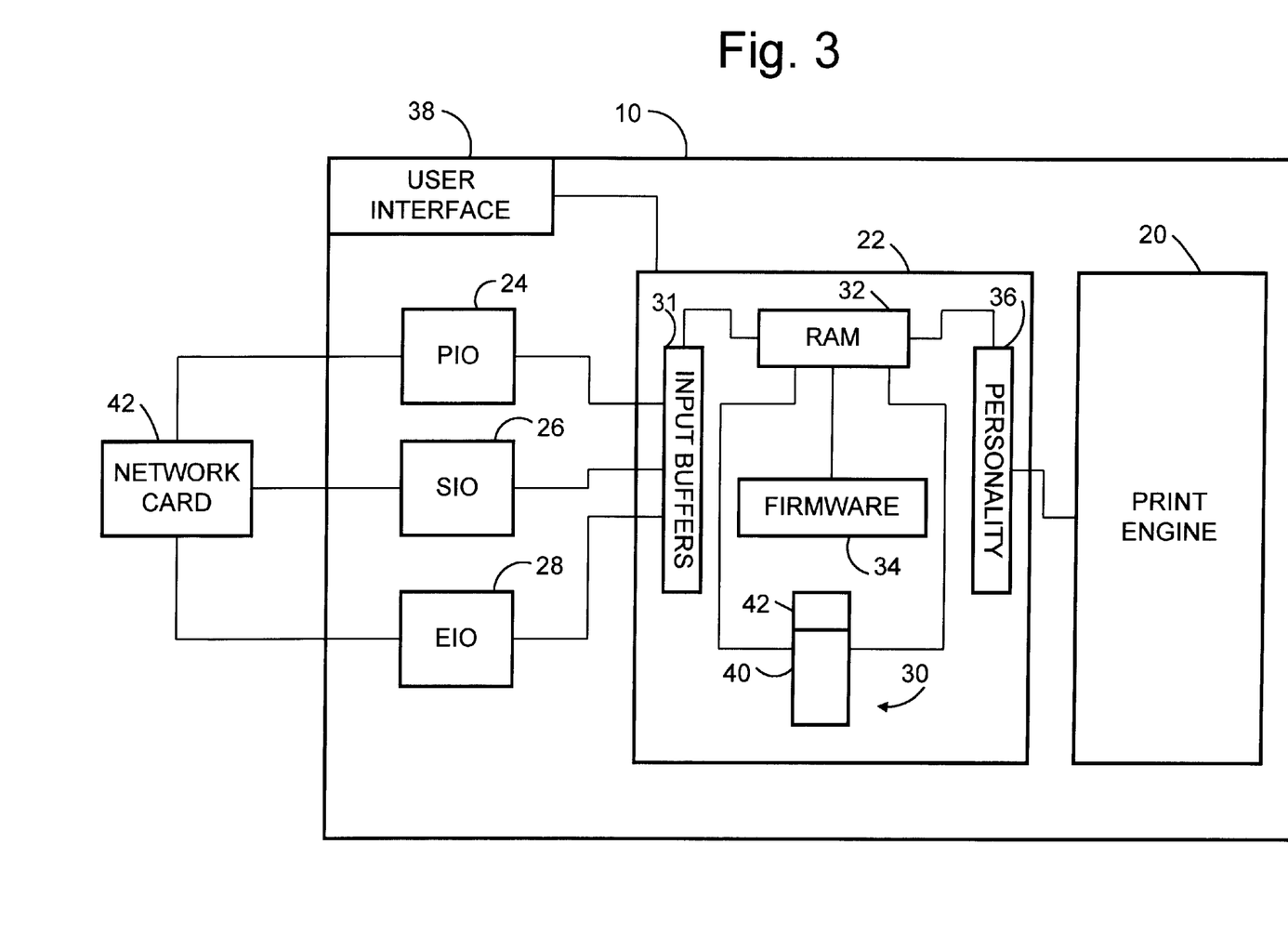
FIG. 3 is a more detailed schematic representation of the printer illustrated in FIGS. 1 and 2.

Referring now to FIGS. 1–3, the invention is shown implemented on a laser printer, which is designated generally by reference number 10. The invention is not limited to laser printers as it is equally applicable to other image forming devices that utilize a disk drive or other suitable data storage device, including Mopiers®, ink jet printers, impact printers, thermal printers and the like. In this particular embodiment of the invention, a personal computer 12 is connected to a printer 10 through a network 14. The basic components of printer 10 and computer 12 are shown schematically in FIG. 2. The components of printer 10 are shown schematically in more detail in FIG. 3. The connection between computer 12 and printer 10 may be a direct connection using a parallel or serial cable or a wireless or remote connection via a telecommunication link, an infrared link or a radio frequency link.

Computer 10 has a document generating application software 16 and associated printer driver 18 in its memory. Collectively, computer 10, application software 16 and driver 18 represent one of the various possible source document generators referred to earlier. As will be better understood later, the primary criteria of the source document generator is that it be configured to send a single transmission of one copy of the document accompanied by a command indicating the desired disposition of the document. For some of the job retention and selection features, printer driver 18 is modified from its conventional form such that when a user requests a job retention feature, the transmission of data to printer 10 contains a single collated electronic copy of the document accompanied by the appropriate Printer Job Language (PJL) variables.

In simplified and general terms, printer 10 has a print engine 20 connected to a controller/formatter 22 which receives data to be printed from a parallel input/output (PIO) port or channel 24, a serial input/output (SIO) port or channel 26 and a enhanced input/output (EIO) port or channel 28. Other inputs, including remote and wireless couples, are also compatible with the invention. Controller 22 includes a data storage device, here disk drive 30, associated electronics connecting controller 22 to the inputs, processing electronics, input buffers 31, random access memory (RAM) 32, read only memory (ROM) 34 and associated electronics connecting controller 22 to print engine 20. Other data storage devices are also compatible with the invention. For example, a CD ROM, expanded RAM or tape drive might be used in place of or in combination with disk drive 30. The controlling firmware for the controller 22 resides in ROM 34. A specific portion of this firmware 34 is referred to as a personality 36, which controls how the print job is rendered into a rastorized data stream. The firmware can, and often does, contain multiple personalities to render different kinds of print jobs. For example, there is a separate personality for PostScript™ and Printer Command Language (PCL) print jobs. The invention may be implemented in existing printers and Mopiers that have a disk drive or other suitable data storage device by substituting a modified ROM 34 for the existing ROM.

RAM 32 is used for several functions which can be generally categorized as buffering incoming data, read/write buffering, converting the data to a rastorized output stream and buffering the rastorized data for output to print engine 20. As data is received from the input, the data is parsed to strip out the PJL printer control commands. These commands are used by controller 22 to store a print job on disk 30.

Job retention, generally, is the printer's ability to store a print job on the printer's disk drive or other data storage device. The print job is then available to the user for future printing. Several variations of the general job retention feature are available. These are referred to as "proof and hold", "simple retention" and "private printing." A print job is specified for retention using PJL commands in the data stream (or in the Postscript™ language for Apple® computers). Once a print job is stored on disk drive 30, it is available for selection or deletion by the user via the printer's user interface 38, which is also referred to as control panel 38. The print job may be stored as a data file before it is rendered to a rastorized image file or, preferably, as a rastorized image file. An optional network interface card 44 on printer 10 also allows a network administrator or other remote user to communicate with the printer to select and delete print job files using Peripheral Management Language (PML) commands. Job retention features are available only if a disk drive or other suitable data storage device is installed in printer 10. It is desirable that driver 18 be configured to query printer 10 to determine if a suitable data storage device is installed. If a suitable data storage device is not installed in printer 10, the job retention features are not available to the user. If driver 18 cannot query the printer, it may send the job retention commands to the printer, but they will be ignored and a PJL error message will be generated. The specific job retention features are described in more detail below.

PROOF AND HOLD

The proof and hold retention feature provides a quick and easy way for the user or users to proof a document by printing one or more copies of the document and storing the document so that additional copies may subsequently be printed, if desired, right at the printer. Proof and hold print jobs may be stored in a permanent storage area 40 of disk drive 30 or, as is preferred, in a temporary storage area 42. If the proof and hold print job is sent to temporary storage area 42, it is automatically deleted when space in the temporary storage area is needed for another print job. Hence, storage of a proof and hold print job is temporary in the sense that it is automatically deleted when that memory space is needed to store another print job. For example, in one commercial implementation of this embodiment of the invention, the Hewlett-Packard LaserJet 8100 laser printer, print jobs temporarily stored through the proof and hold feature are automatically deleted on a first in first out (FIFO) basis when the memory allocated to the proof and hold feature is full and new print jobs are added. If the proof and hold print job is sent to permanent storage area 40, it may only be deleted by a user command entered through control panel 38 or by a network administrator through PML commands entered via optional network interface card 44. Any proof and hold print job may be selected for printing additional copies through a menu selection on the printer's control panel 38 as described below.

Figure 4A:
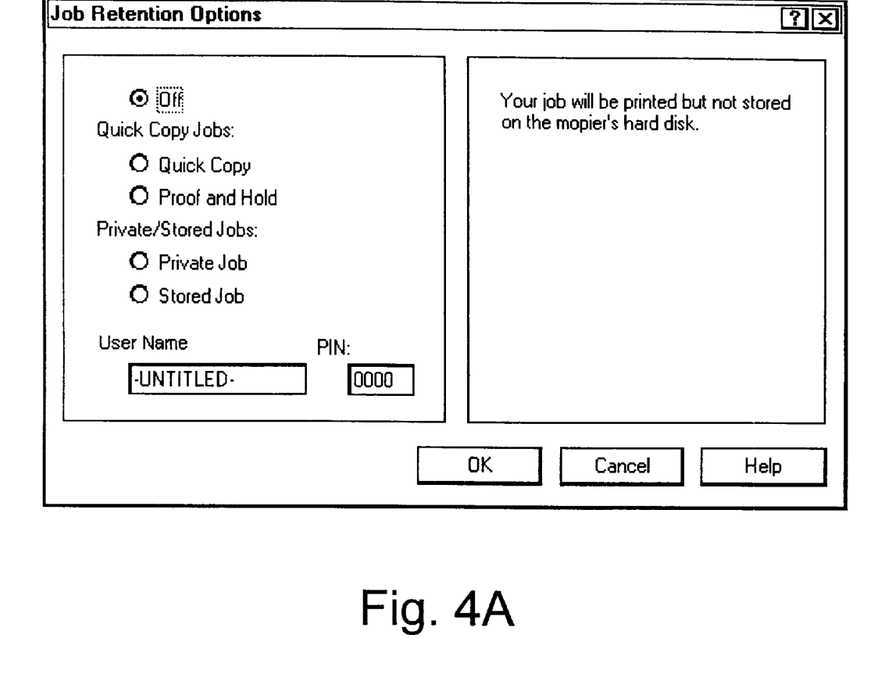
FIGS. 4A–4E are Windows™ displays showing the menu selections presented to the user on the computer to select the various job retention features of the invention.
Figure 4B:
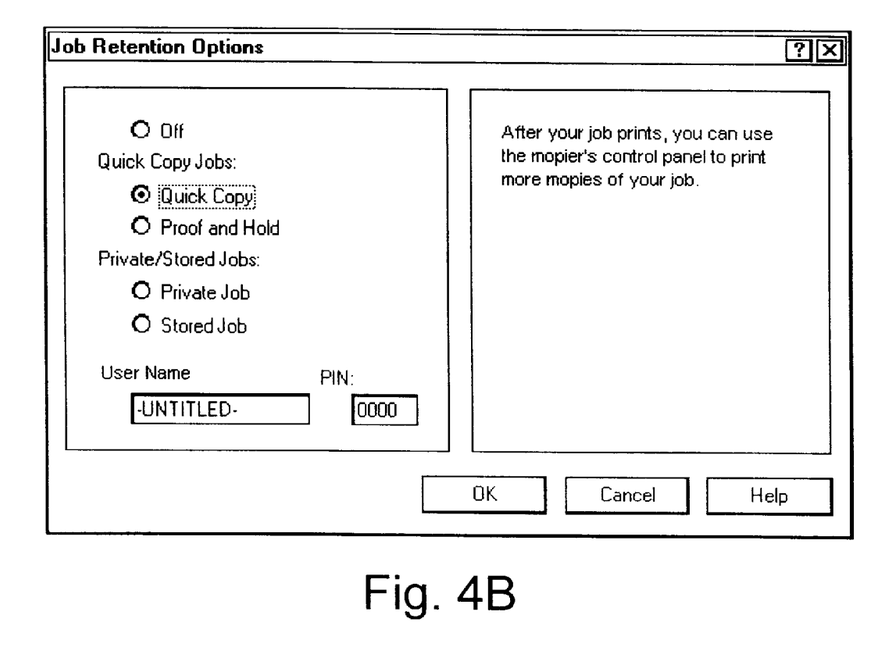
Figure 4C:
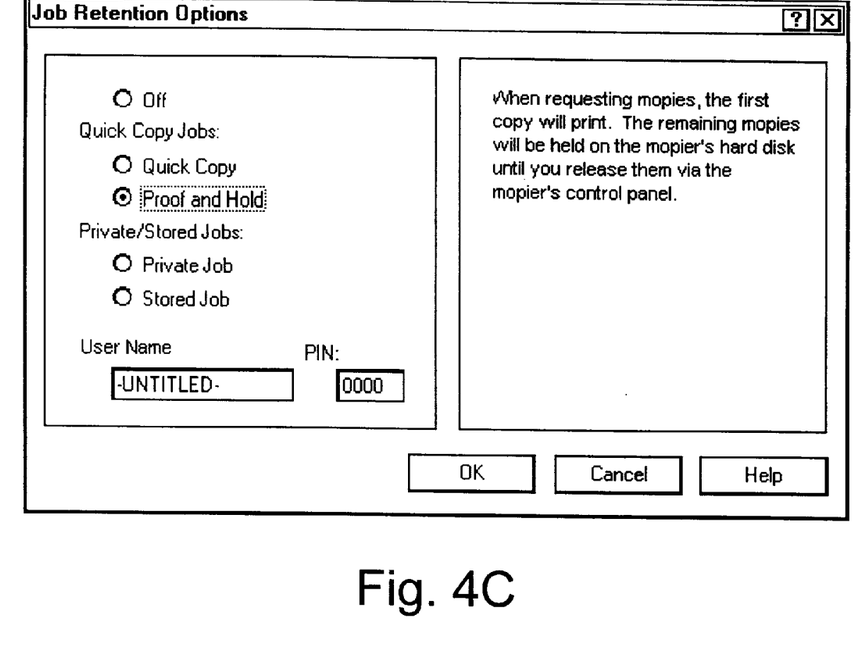

The menu selections presented to the user on computer 12 through printer driver 18 to select the various job retention features are illustrated in FIGS. 4A–4E. If "off" is selected as shown in FIG. 4A, the job retention features are bypassed, the print job is not stored on printer 10 and the job is printed in the conventional manner. Two versions of the proof and hold feature are available under the Quick Copy Jobs sub-menu. If the Quick Copy version is selected as shown in FIG. 4B, the requested number of copies are printed and the print job is stored on printer 10 in temporary storage 42 so that the user can subsequently print additional copies at the printer. It is expected that the Quick Copy version of the proof and hold feature will usually be designated as the default setting in printer driver 18 so that Quick Copy is automatically enabled if the user does not specify a disposition for the print job. If the Proof and Hold version is selected as shown in FIG. 4C, the first copy of the document is printed and the remaining copies are stored on printer 10 in temporary storage 42 so that the user can subsequently print the additional copies at the printer.

Quick Copy proof and hold is activated by printer driver 18 by setting the PJL HOLD variable to ON in the print job data stream (@ PJL SET HOLD=ON). When the print job is then sent to printer 10, the requested number of copies is printed and the document is stored on disk drive 30. If the user selects Proof and Hold, driver 18 will set the PJL HOLD variable to PROOF (@PJL SET HOLD=PROOF). When the print job is then sent to printer 10, only the first copy is printed and the remaining copies are stored on disk drive 30.

Figure 5:
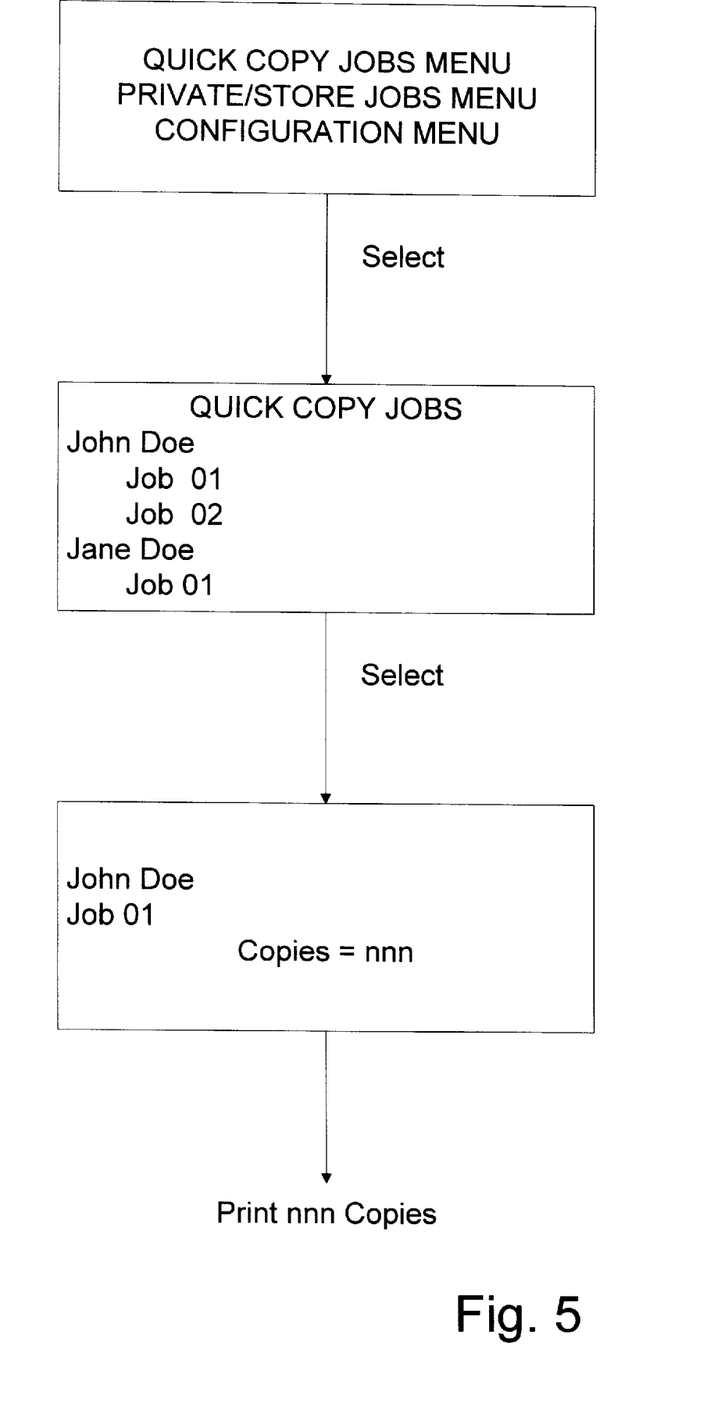
FIG. 5 is a diagram showing the sequence of steps performed at the printer control panel to print additional copies of Proof and Hold print jobs.
Figure 6:
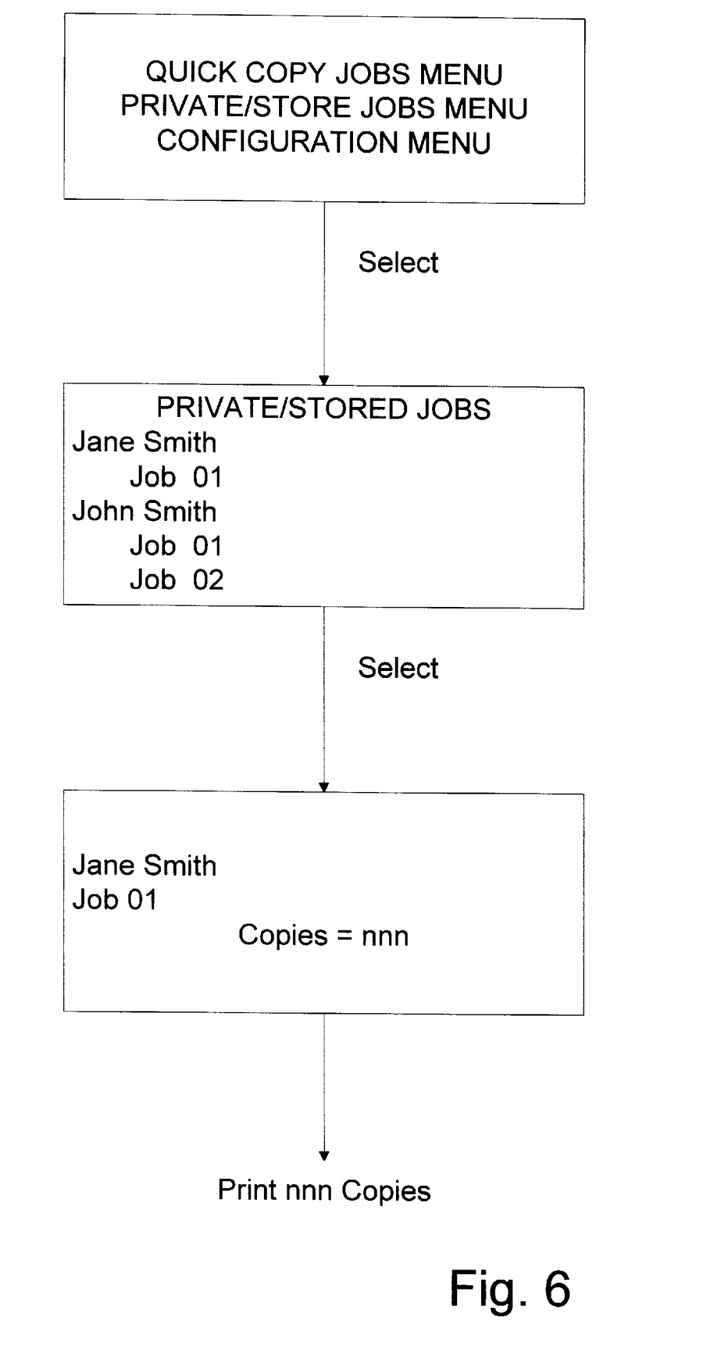
FIG. 6 is a diagram showing the sequence of steps performed at the printer control panel to print copies of Stored Job print jobs.

The default Quick Copy proof and hold requires no user interaction with printer driver 18. When a user sends a print job to the printer, the desired number of copies are printed and the document is stored on disk drive 30 unless the user opens the Job Retention Options menu in printer driver 18 and specifically selects an alternate disposition. For either the Quick Copy or the Proof and Hold versions of the proof and hold feature, the user may print additional copies of a document by entering the QUICK COPY JOBS menu on printer control panel 38 and selecting the appropriate user name. Printer driver 18 controls the number of print jobs that are stored for each user. Firmware 34 supports any number of print jobs per user. Each entry in the QUICK COPY JOBS menu requires a user name. An optional job name may also be used to identify multiple jobs for individual users. To release either a Quick Copy or Proof and Hold print job for additional copies, the user enters the QUICK COPY JOBS menu, selects his or her user name, and enters the number of copies he/she wants to print. The sequence of steps performed at control panel 38 to print the additional copies is illustrated in FIG. 5. The additional copies are printed immediately from the stored file at "engine speed."

Quick Copy type proof and hold print jobs are or may be deleted as follows.

1. Printer 10 will automatically delete the print job anytime additional memory space is needed in temporary storage area 42 of disk drive 30 to store incoming proof and hold print jobs.
2. The user may explicitly delete a print job by selecting the appropriate user name from the QUICK COPY JOBS menu at control panel 38 and set the number of copies to "delete."
3. A network administrator may explicitly delete a print job through a PML command entered via optional network interface card 44.
4. Printer 10 will automatically replaced a print job by the next proof end hold print job from the same user.
5. Printer 10 will automatically delete all print jobs in temporary storage area 42 when the printer is turned off and on.

A Proof and Hold type proof and hold print job is or may be deleted as follows.

1. Printer 10 will automatically delete the print job anytime additional memory space is needed in temporary storage area 42 of disk drive 30 to store incoming proof and hold print jobs but only after the user has released additional copies for printing.
2. The user may explicitly delete a print job by selecting the appropriate user name from the QUICK COPY JOBS menu and set the number of copies to "delete."
3. A network administrator may explicitly delete a print job through a PML command entered via optional network interface card 44.
4. Printer 10 will automatically replaced a print job by the next proof end hold print job from the same user but only after the user has released additional copies for printing.
5. Printer 10 will automatically delete all print jobs in temporary storage area 42 when the printer is turned off and on.

The number of print jobs that may be stored in the temporary storage area 42 of disk drive 30 may be configured to the desired size through control panel 38 and through PML commands entered via network interface card 44. The control panel menu item through which temporary storage area 42 is configured is designated QUICK COPY SIZE. Although any size of the memory may be allocated to temporary storage, the Hewlett-Packard LaserJet 8100 printer, for example, will allow the user to store up to fifty files in temporary storage area 42. The default setting is thirty-two files. This represents the total number of print jobs that may be temporarily stored under the Quick Copy and Proof and Hold items in the QUICK COPY JOBS sub-menu of driver 18 (shown in FIGS. 4A–4E). The QUICK COPY SIZE menu item is located in the printer control panel CONFIGURATION MENU.

SIMPLE RETENTION

Figure 4D:
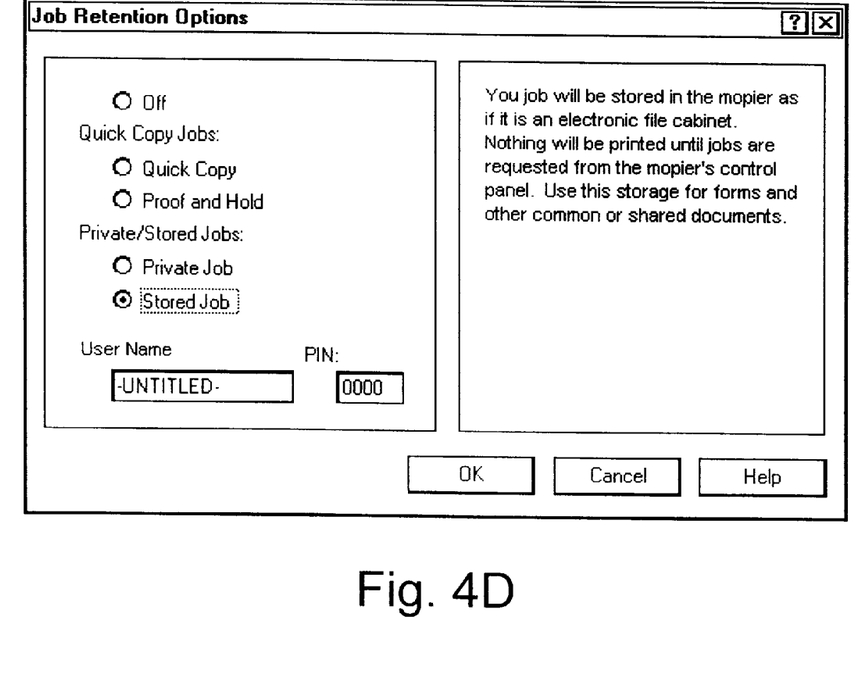
Figure 7:
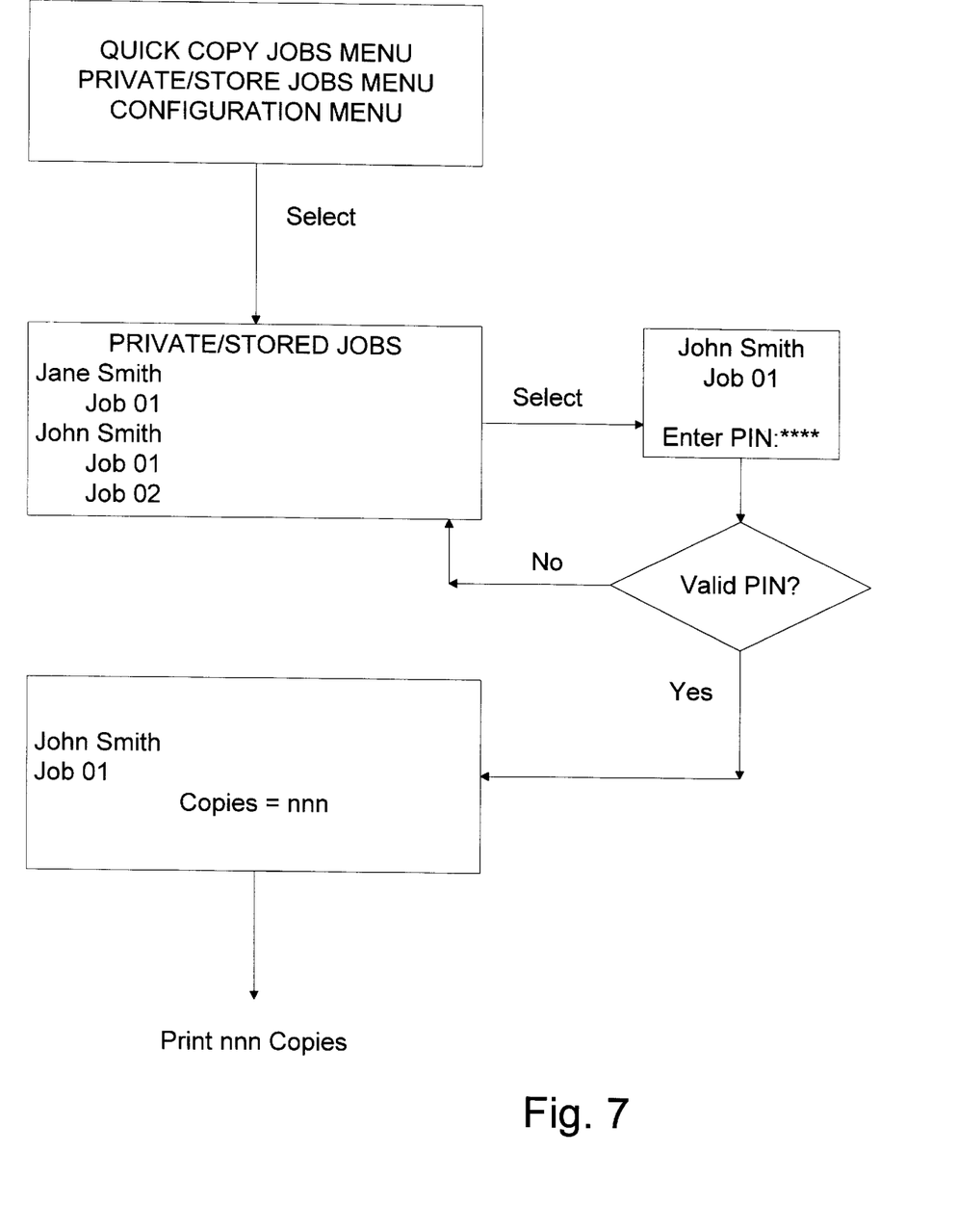
FIG. 7 is a diagram showing the sequence of steps performed at the printer control panel to print copies of Private Job print jobs.

The simple retention feature of the invention allows the user to download a print job to the printer disk drive without printing the document. Future printing is then available through the printer control panel 38 and through PML commands entered via network interface card 44. As shown in FIG. 4D, simple retention is used by selecting the Stored Job item in the a Private/Stored Jobs sub-menu in the Job Retention Options menu in driver 18. This simple retention feature is activated by printer driver 18 by setting the PJL HOLD variable to STORE (@PJL SET HOLD=STORE). When the print job is then sent to printer 10, the print job is stored on disk drive 30, preferably in permanent storage area 40, without printing the document even once. The user print copies of the document by entering the PRIVATE/STORED JOBS menu on printer control panel 38, selecting the appropriate user name and, if applicable, the appropriate job name and entering the desired number of copies. The sequence of steps performed at control panel 38 to print copies of a Stored Job is illustrated in FIG. 7.

Print jobs stored in permanent storage area 40 through this simple retention feature are stored indefinitely and may only be deleted by a user. A user may delete a Stored Job by selecting the appropriate user name from the PRIVATE/STORED JOBS menu on control panel 38 and setting the number of copies to delete. Alternatively, the network administrator may delete a Stored Job via software using PML commands entered through network interface card 44.

PRIVATE PRINTING

Figure 4E:
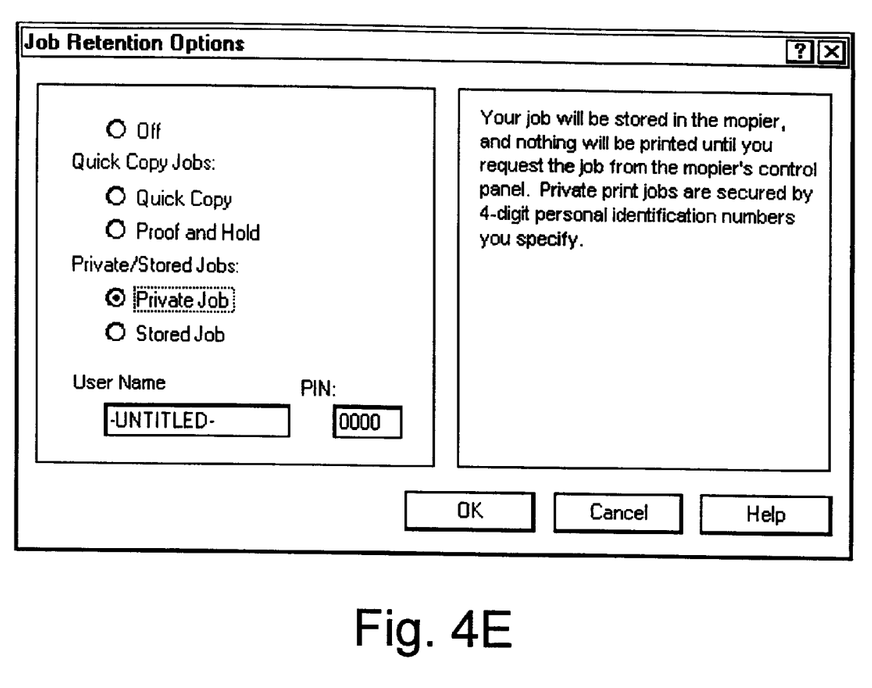

Private printing allows the user to delay printing until a privacy code is entered at printer control panel 38. For example, a user may need to print a sensitive document such as an employee performance evaluation or a patient hospital record. The user, therefore, wants to be at the printer when the document is printed. As shown in FIG. 4E, private printing is accomplished by allowing the user to select the Private Job item and specify a privacy code (in this case a four digit PIN number) in the Private/Stored Jobs sub-menu of the Job Retention Options menu in driver 18. Future printing is then available through the printer control panel 38 only upon entering the privacy code specified by the user.

The private printing feature is activated by printer driver 18 by setting the PJL HOLD variable to ON (@PJL SET HOLD=ON), setting a PJL HOLDTYPE variable to PRIVATE (@PJL SET HOLDTYPE=PRIVATE) and setting a PJL HOLDKEY variable to the privacy code specified by the user (@PJL SET HOLDKEY="xxxx"). When the printer detects that the PJL HOLDTYPE variable is set to PRIVATE, it will look for a HOLDKEY variable in the job data stream. The HOLDKEY variable contains the privacy code which will be saved on disk drive 30 with the device ready bits for the job. When the print job is sent to printer 10, the print job is stored on disk drive 30, preferably in temporary storage area 42, without printing the document. The user may print copies of the document by entering the PRIVATE/STORED JOBS menu on printer control panel 38, selecting the appropriate user name, entering the privacy code and entering the desired number of copies. The sequence of steps performed at control panel 38 to print copies of a Private Job is illustrated in FIG. 8.

Private print jobs are automatically deleted after the user has released the job for printing or when the printer is turned off unless the job is also specified as a Store Job. A private print job may be deleted at any time at control panel 38 by selecting the appropriate user name from the PRIVATE/STORED JOBS menu on control panel 38, entering the privacy code and setting the number of copies to delete. Alternatively, the user may delete a Private Job via software by using PML commands entered through network interface card 44 without entering a privacy code in case the user forgets the code.

The PJL variables and the values for those variables used to implement the Proof and Hold, Simple Retention and Private Printing features described above are summarized below.

@PJL SET HOLD=OFF/ON/PROOF/STORE/ PRINT

The HOLD variable specifies the retention classification of the job. The legal PJL commands for this variable are SET and INQUIRE. DEFAULT is not allowed. The HOLD variable appears in the PJL INFO VARIABLES list. The values for the HOLD variable indicate whether the job is printed immediately and/or stored as follows.

- @PJL SET HOLD=OFF The job is printed but not stored on disk after printing.
- @PJL SET HOLD=ON The requested number of copies are printed and the job is stored on the printer's disk drive. The job is then available for printing additional copies through the printer control panel. It is expected that ON will be the default value for the HOLD variable. Preferably, the job is stored in a temporary storage area on the disk drive and the job is removed on a first in first out basis when the temporary storage area reaches full capacity.
- @PJL SET HOLD=PROOF One copy of the job is printed and the remaining copies are stored on the printer's disk drive. The remaining copies and additional copies of the job are then available for printing through the printer control panel. Preferably, the job is stored in a temporary storage area on the disk drive and the job is removed on a first in first out basis when the temporary storage area reaches full capacity but only after the remaining copies of the print job are printed.
- @PJL SET HOLD=STORE The job is stored on the printer's disk drive, but not printed immediately. The job is available for printing through the printer control panel. Preferably, the job is stored in a permanent storage area on the disk drive and the job may only be deleted by the user at the printer control panel.

@PJL SET USERNAME="<80 character name>"

The USERNAME variable is a name up to eighty characters obtained by the driver internally or through user input. If the job stream does not contain a USERNAME, the default value is "NO USER NAME." The driver determines the size of the printer control panel and sends a string of appropriate length. The legal PJL commands for this variable are SET and INQUIRE. DEFAULT is not allowed. The USERNAME variable appears in the PJL INFO VARIABLES list.

@PJL SET HOLDTYPE=PUBLIC/PRIVATE

The HOLDTYPE variable specifies the privacy level of the job. The legal PJL commands for this variable are SET and INQUIRE. DEFAULT is not allowed. The HOLDTYPE variable appears in the PJL INFO VARIABLES list. The values for the HOLDTYPE are as follows.

- @PJL SET HOLDTYPE=PUBLIC The job does not require a PIN number or other privacy code to access for printing. It is expected that PUBLIC will be the default value for the HOLDTYPE variable.
- @PJL SET HOLDTYPE=PRIVATE The job requires a PIN number or other privacy code to access for printing. The privacy code is specified by the HOLDKEY variable. If the HOLDTYPE variable is set to PRIVATE, a HOLDKEY value must be specified or the job will be considered PUBLIC.

@PJL SET HOLDKEY=4 digits, 0000 . . . 9999

The HOLDKEY variable is a four digit string specified in the job stream that must be entered at the printer control panel to release the job for printing. The legal PJL commands for this variable are SET and INQUIRE. DEFAULT is not allowed. The HOLDKEY variable appears in the PJL INFO VARIABLES list.

@PJL SET QTY=3 digits, 1–999

The QTY variable specifies the number of collated copies. The legal PJL commands for this variable are SET and INQUIRE. DEFAULT is not allowed. The QTY variable appears in the PJL INFO VARIABLES list.

The interaction between the HOLD and HOLDTYPE variables is summarized below in Tables 1 and 2.

TABLE 1

| HOLDTYPE = PUBLIC | Print Immediately | Store On Disk | Add To QUICK COPY JOBS MENU | Add To PRIVATE/ STORED JOBS MENU | Delete After Printing From Control Panel | Delete When Bumped From QUICK COPY JOBS MENU |
|---|---|---|---|---|---|---|
| HOLD = OFF | Yes | No | No | No | N/A | N/A |
| HOLD = ON | Yes | Yes | Yes | No | No | Yes |
| HOLD = PROOF | Yes | Yes | Yes | No | No | Yes |
| HOLD = STORE | No | Yes | No | Yes | No | N/A |

TABLE 2

| HOLDTYPE = PRIVATE HOLDKEY = xxxx | Print Immediately | Store On Disk | Add To QUICK COPY JOBS MENU | Add To PRIVATE/ STORED JOBS MENU | Delete After Printing From Control Panel | Delete When Bumped From QUICK COPY JOBS MENU |
|---|---|---|---|---|---|---|
| HOLD = OFF | No | Yes | No | Yes | Yes | N/A |
| HOLD = ON | No | Yes | No | Yes | Yes | N/A |
| HOLD = PROOF | No | Yes | No | Yes | Yes | N/A |
| HOLD = STORE | No | Yes | No | Yes | Yes | N/A |

While the present invention has been shown and described with reference to the foregoing exemplary embodiments, it is to be understood that other forms and details may be made thereto without departing from the spirit and scope of the invention as expressed in the following claims.

What is claimed is:

1. An image forming device that stores a document and prints one or more copies of the document from an electronic transmission of a single copy of the document by a source document generating device, the transmission including a command indicating the desired disposition of the document, the desired disposition selected from a group of available dispositions that includes a first disposition printing the document at least once and storing the document at the image forming device and a second disposition storing the document at the image forming device without first printing the document and holding it there until released for printing, the image forming device comprising:

a user interface;

a controller including a data storage device, the controller electrically connected to the user interface and the controller configured to receive the electronic transmission of data representing a document to be printed and a command for the desired disposition of the document and, in response to a command for the first disposition, to cause the image forming device to print the document at least once and store the document in the storage device or, in response to a command for the second disposition, to cause the image forming device to store the document in the storage device without first printing the document and hold it there until released for printing; and a print engine connected to the controller.

2. The device according to claim 1, wherein the group of available dispositions also includes a third disposition storing the document in the storage device and holding it there until the document is released for printing by inputting a predefined privacy code and the controller is further configured, in response to a command for the third disposition, to cause the image forming device to store the document in the storage device and hold it there until the document is released for printing by inputting a predefined privacy code.

3. The device according to claim 1, wherein a document is released for printing via the user interface.

4. The device according to claim 1, further comprising a network interface card electrically connected to the controller and wherein a document is released for printing via a command entered by a remote user through the network interface card.

5. The device according to claim 1, wherein the controller is further configured to identify a document stored in response to a command for the first disposition as a selectable item on a first menu displayed at the user interface and to identify a document held in response to a command for the second disposition as a selectable item on a second menu displayed at the user interface.

6. The device according to claim 1, wherein the document is stored as a data file.

7. The device according to claim 1, wherein the document is stored as a rastorized image file.

8. The device according to claim 1, wherein the storage device includes a temporary storage area and a permanent storage area and documents stored in response to a command for the first disposition are stored in the temporary storage area.

9. The device according to claim 8, wherein the controller is further configured to remove documents from the temporary storage area automatically on a first in first out basis as the temporary storage area reaches full capacity.

10. The device according to claim 1, wherein the storage device includes a temporary storage area and a permanent storage area and documents held in response to a command for the second disposition are stored in the permanent storage area.

11. The device according to claim 10, wherein the controller is further configured to remove documents from the permanent storage area only by a command entered through the user interface.

12. A system for printing and storing a document on a printer, comprising:

a source document generator configured to generate and transmit an electronic version of a document and to transmit a command indicating a desired disposition for the document, the desired disposition selected from a group of available dispositions that includes a first disposition printing the document at least once and storing the document at the image forming device and a second disposition storing the document at the image forming device without first printing the document and holding it there until released for printing;

an image forming device capable of being operatively coupled with the source document generator to receive transmissions from the source document generator, the image forming device comprising a user interface, a controller including a data storage device, the controller electrically connected to the user interface and the controller configured to receive the electronic transmission of data representing a document to be printed and a command for the desired disposition of the document and, in response to a command for the first disposition, to cause the image forming device to print the document at least once and store the document in the storage device or, in response to a command for the second disposition, to cause the image forming device to store the document in the storage device without first printing the document and hold it there until released for printing; and a print engine connected to the controller.

13. The device according to claim 12, wherein the group of available dispositions also includes a third disposition storing the document in the storage device and holding it there until the document is released for printing by inputting a predefined privacy code and the controller is further configured, in response to a command for the third disposition, to cause the image forming device to store the document in the storage device and hold it there until the document is released for printing by inputting a predefined privacy code in the case of a command for the third disposition.

14. A method for printing and/or storing a document on an image forming device, comprising:

generating electronic data representing a document to be printed and/or stored on the image forming device and a command designating the desired disposition of the document, the desired disposition selected from a group of available dispositions that includes a first disposition printing the document at least once and storing the document at the image forming device and a second disposition storing the document at the image forming device without first printing the document and holding it there until released for printing;

receiving the electronic data in the image forming device and analyzing the data to distinguish between commands for the first and second; and in the case of a command for the first disposition, printing the document at least once and storing the document at the image forming device, or in the case of a command for the second disposition, storing the document at the image forming device without first printing the document and holding it there until released for printing.

15. The device according to claim 14, wherein the group of available dispositions also includes a third disposition storing the document in the storage device and holding it there until the document is released for printing by inputting a predefined privacy code and the method further comprising receiving the electronic data in the image forming device and analyzing the data to distinguish between commands for the first, second and third dispositions and, in the case of the third disposition, storing the document in the storage device and holding it there until the document is released for printing by inputting a predefined privacy code.

16. The method according to claim 15, further comprising identifying stored documents as a selectable item on a first menu displayed at the user interface and the held documents as a selectable item on a second menu displayed at the user interface.

17. The device according to claim 14, further comprising releasing a document for printing via a command entered by a remote user through a network interface card electrically connected to the controller.

18. The method according to claim 14, further comprising storing the document as a data file.

19. The method according to claim 14, further comprising storing the document as a rastorized image file.

20. The device according to claim 14, further comprising releasing a document for printing via a user interface on the image forming device.

* * * * *